United States Patent [19]
Khan et al.

[11] Patent Number: 5,996,342
[45] Date of Patent: Dec. 7, 1999

[54] HYDROSTATIC DRIVE TRAIN CONTROLLER

[75] Inventors: Aftab A. Khan, Dearborn, Mich.; Peter J. Dix, Naperville; Alan D. Berger, Winfield, both of Ill.; Richard L. Hall; Rich Lech, both of Burlington, Iowa

[73] Assignee: Case Corporation, Racine, Wis.

[21] Appl. No.: 09/102,785

[22] Filed: Jun. 23, 1998

[51] Int. Cl.⁶ .................................................. F16D 31/02
[52] U.S. Cl. .................................. 60/421; 60/426; 60/432
[58] Field of Search ........................... 60/421, 426, 431, 60/432

[56] References Cited

U.S. PATENT DOCUMENTS

| | | | |
|---|---|---|---|
| 5,063,740 | 11/1991 | Aihara | 60/432 |
| 5,426,939 | 6/1995 | Cottrell | 60/431 X |
| 5,873,427 | 2/1999 | Ferguson et al. | |

FOREIGN PATENT DOCUMENTS

| | | | |
|---|---|---|---|
| 3106436 | 9/1982 | Germany | 60/431 |
| 8001400 | 7/1980 | WIPO | 60/431 |

*Primary Examiner*—Hoang Nguyen
*Attorney, Agent, or Firm*—Mayer, Brown & Platt

[57] ABSTRACT

An anti-stall and bias control for a hydrostatic drive train system is disclosed. The system is used on a hydrostatic drive vehicle with an engine coupled to a first and second hydraulic pump. The first and second hydraulic pumps are coupled to first and second drive motors which drive wheels of the vehicle. The power to the drive motors is controlled by a control unit which output signals proportional to the desired power output from the motors. An engine speed sensor determines the speed of the engine. The control circuit reads the engine speed and determines whether the engine is in a stall condition. If the engine is in a stall condition, the control circuit scales the control signals of the first and second motor to reduce power output. A bias control is also provided to allow the vehicle operator to select greater relative power to either the first or second motor. The bias control outputs a bias signal which is read by the control unit. The bias signal is converted into a scaling value which is multiplied by the control signal to the nonselected motor to reduce power of the motor.

12 Claims, 4 Drawing Sheets

HYDROSTATIC DRIVE TRAIN CONTROLLER

FIELD OF INVENTION

This invention relates to a controller for a hydrostatic drive. More specifically, this invention relates to a controller which provides anti-stall and bias control for a hydrostatic drive.

BACKGROUND OF INVENTION

A common propulsion drive for work vehicles such as skid steers is a hydrostatic drive system. Hydrostatic drives are advantageous because they are capable of providing a range of different speeds without the need for mechanical gearing assemblies. Hydrostatic drives are based on a hydraulic pump or pumps which are powered by the engine of the work vehicle. The engine is a conventional diesel or gasoline engine having a flywheel which turns the pump. Thus, the pump speed and corresponding fluid flow rate is directly proportional to the engine speed.

The hydraulic pump has a displacement chamber for hydraulic fluid. The fluid flow is controlled by a swash plate which controls the length of the displacement chamber. The length of the displacement chamber moderates the hydraulic fluid flow produced by the pump. The pump is fluidly connected to hydraulic devices such as hydraulic cylinders for driving various actuators, such as lift arms or ground stabilizers, attached to the work vehicle. The hydraulic pump is also fluidly connected to a drive motor. The fluid flow from the pump causes the drive motor to rotate the axles which drive the wheels and in turn the work vehicle. Typically, the right and left wheels of a work vehicle have separate motors.

Present hydrostatic drive trains are susceptible to stalling the engine by placing too much strain on the hydraulic pump due to an increase in power demand. When too much hydraulic fluid flow is required for driving the vehicle or operate hydraulic actuators, the engine may stall, thus cutting off all hydraulic fluid flow from the pumps. Additionally, there may be circumstances where it is desirable to supply additional hydraulic fluid flow to one of the side motors. This may occur in the case of an imbalanced load or travel on a slanted surface.

Such differences in power to the right and left side motors must be addressed manually by the work vehicle operator. Such an adjustment is difficult for an operator to maintain. Additionally, when an operator fails to properly control fluid flow, the engine may stall out. Finally, although hydrostatic drive trains provide precise turning control, often an operator cannot take advantage of this feature since manual precision operation of both motors is difficult to maintain.

Thus, there exists a need for an electronic hydrostatic drivetrain controller which prevents an engine from stalling. Further, there is a need for an electronic hydrostatic drive controller which provides automatic compensation for additional loads placed on different hydrostatic motors. Finally, there is a need for a hydrostatic drive controller which provides precise control of power from either drive motor in a work vehicle.

SUMMARY OF THE INVENTION

The present invention is embodied in a drive train control system for a hydrostatic motor drive having an engine rotatably coupled to drive a fluid pump fluidly coupled to a drive motor. The control system has a speed sensor which periodically senses the speed of the engine. An operator control generates a signal representative of desired fluid flow to the drive motor. An anti-stall circuit is coupled to the speed sensor. The anti-stall circuit includes a stall circuit which compares the engine speed with a previously determined engine speed to determine the susceptibility of the engine to a stall. The anti-stall circuit also has a stall correction circuit which produces a scaling value derived from the susceptibility of a stall. A multiplier circuit is coupled to the output of the stall correction circuit and operator control. The multiplier circuit generates a modified control signal for the fluid pump by multiplying the control signal with the scaling value.

The present invention is also embodied in a drive train control bias system for a hydrostatic motor drive having an engine rotatably coupled to drive a first fluid pump fluidly coupled to a first drive motor and to drive a second fluid pump fluidly coupled to a second drive motor. The system includes a first drive control generating a signal proportional to the level of power desired from the first motor. A second drive control generates a signal proportional to the level of power desired from the second motor. A bias control is provided for selection of greater relative power to either the first or second drive motor. The bias control generates a signal proportional to the selected greater relative power. A scaling circuit is coupled to the bias control and generates a scaling value as a function of the greater relative power signal. A selection circuit is coupled to the scaling circuit. The selection circuit has a first output which is the value of the scaling signal and a second output which is a preselected value. A first multiplier circuit is coupled to the outputs of the selection circuit and the first drive control and multiplies the two signals to produce a control signal to the first fluid pump. A second multiplier circuit is coupled to the outputs of the selection circuit and the second control and multiplies the two signals to produce a control signal to the second fluid pump. The selection circuit outputs the second output to the multiplier of the selected first or second motor and outputs the first output to the other multiplier.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
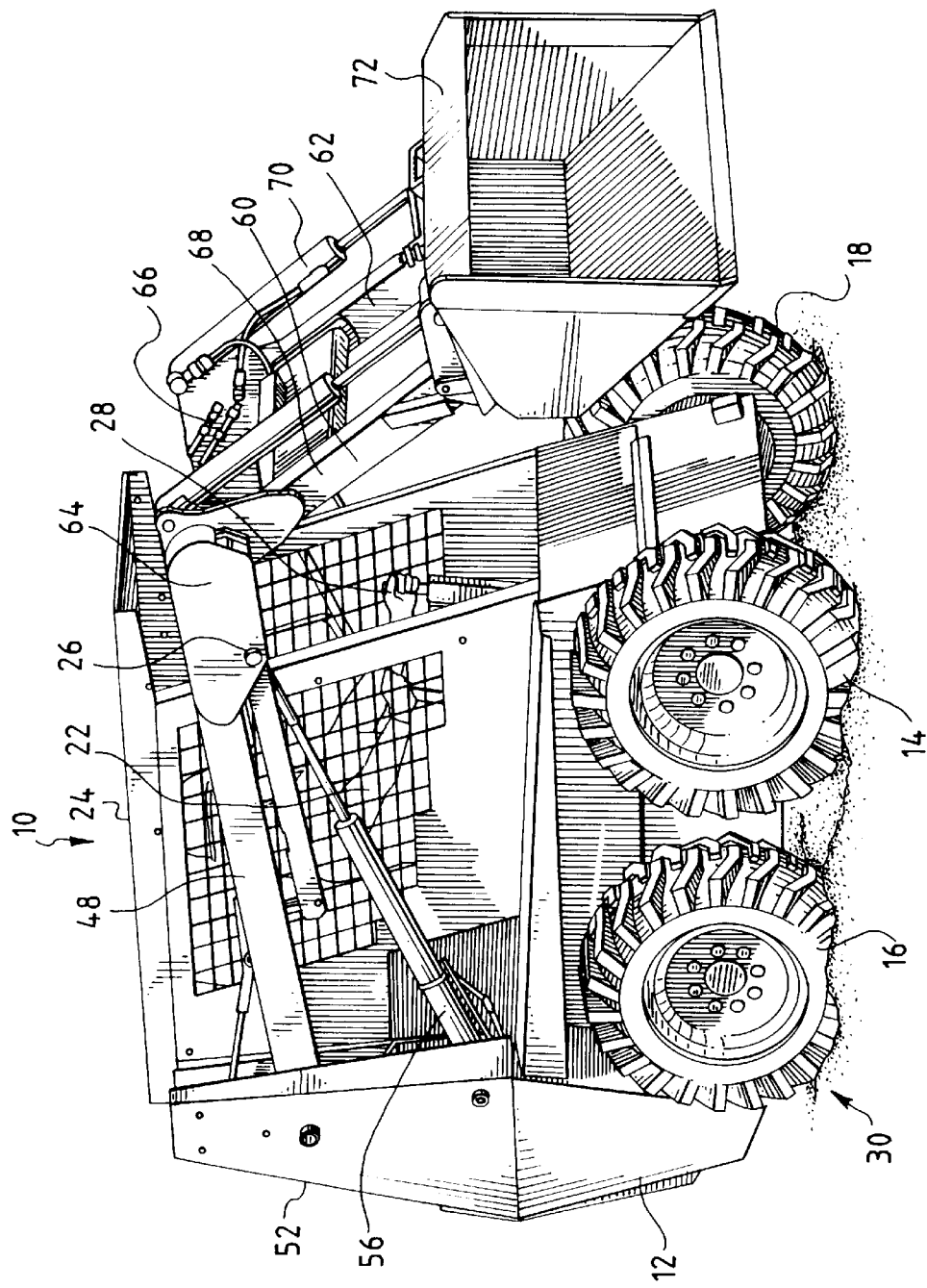
FIG. 1 is a side view of a work vehicle using a hydrostatic drivetrain controller according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
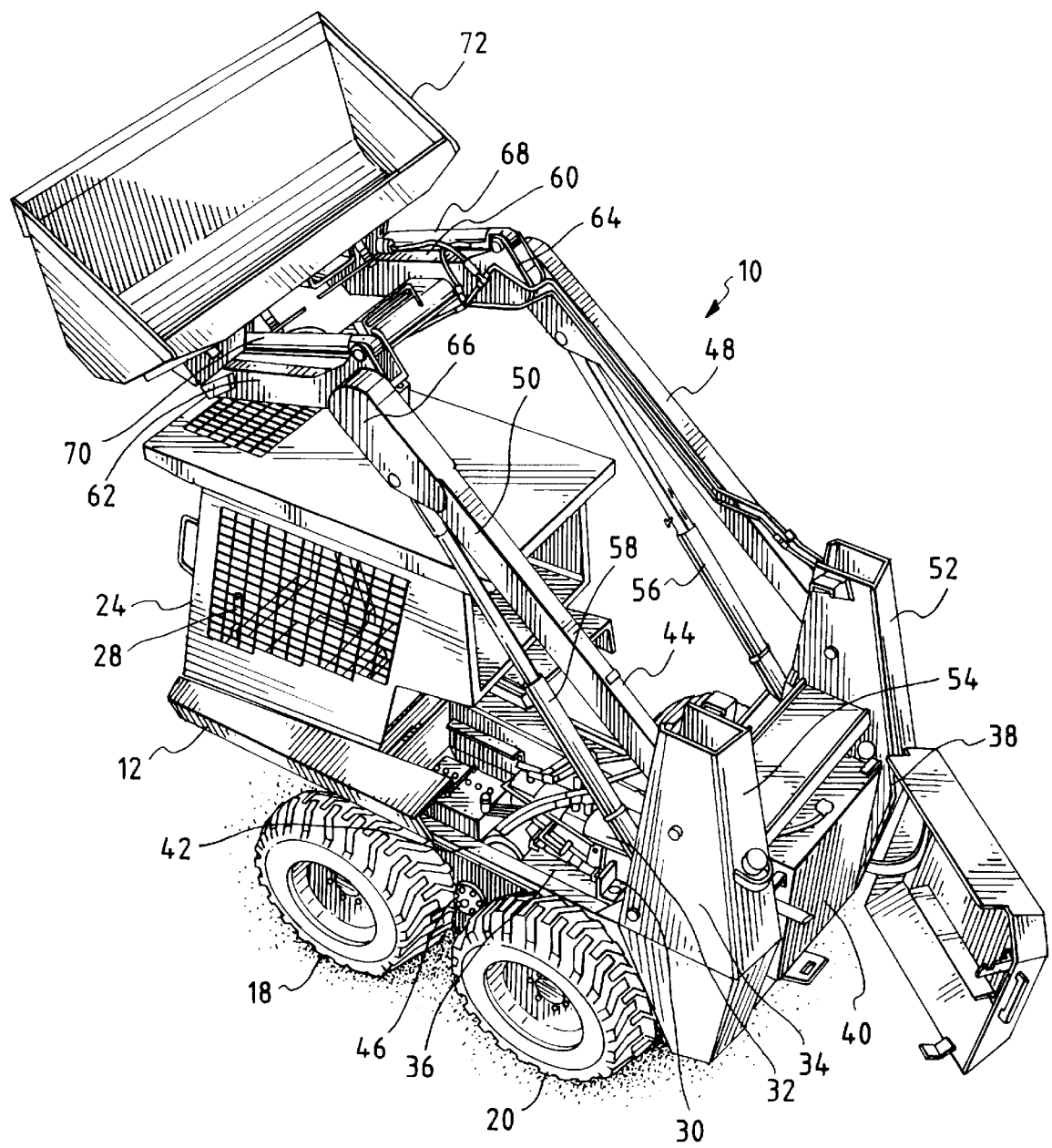
FIG. 2 is a perspective exploded view of the work vehicle in FIG. 1.

Referring now to the drawings and more particularly to FIGS. 1 and 2 which show a side view and an exploded perspective of a work vehicle 10. In this embodiment, the work vehicle 10 is a skid steer such as a Model 1838 skid steer manufactured by Case Corporation. The work vehicle 10 has a body 12 supported by four wheels 14, 16, 18 and 20. The user operates the vehicle 10 from a seat 22 which is located in an operator compartment 24. The operator compartment 24 includes a right joystick 26 and a left joystick 28 which are located on either side of the seat 22. The right joystick 26 controls the rotation of right wheels 14 and 16 of the work vehicle 10 while the left joystick 28 controls the rotation of left wheels 18 and 20 of the work vehicle 10.

The work vehicle 10 is powered by a hydrostatic drivetrain system 30. The hydrostatic drivetrain system 30 includes an engine 32 which has a flywheel 34 and a crankshaft 36. The engine 32 in the preferred embodiment is a Kubota V2203DI-B diesel engine, but any other appropriate diesel or gasoline engine may be used. The fly wheel 34 is coupled to a right hydraulic piston pump 38 and a left hydraulic piston pump 40. The crankshaft 36 is also coupled to a hydraulic gear pump 42. Thus, the engine 32, the piston pumps 38 and 40, and the gear pump 42 are located in tandem with each other. The gear pump 40 drives attachments such as hydraulic actuators for lift arms. The right piston pump 38 powers a right drive motor 44 which propels front and rear right wheels 14 and 16. Similarly, the left piston pump 40 powers a left drive motor 46 which propels the front and rear left wheels 18 and 20.

A pair of loader arms 48 and 50 are mounted on upright supports 52 and 54. The upright supports 52 and 54 are located to the rear of the operator compartment 24. The loader arms 48 and 50 may be raised and lowered by actuating lift actuators 56 and 58. The lift actuators 56 and 58 are hydraulic cylinders powered by the gear pump 40. The loader arms 48 and 50 are pivotally coupled to tilt arms 60 and 62 at pivots 64 and 66. The tilt arms 60 and 62 are rotated around the pivots 64 and 66 by means of tilt actuators 68 and 70 which are hydraulic cylinders powered by the gear pump 28. The tilt arms 44 are attached to an implement attachment. The implement attachment in this embodiment is a loader bucket 72.

Figure 3:
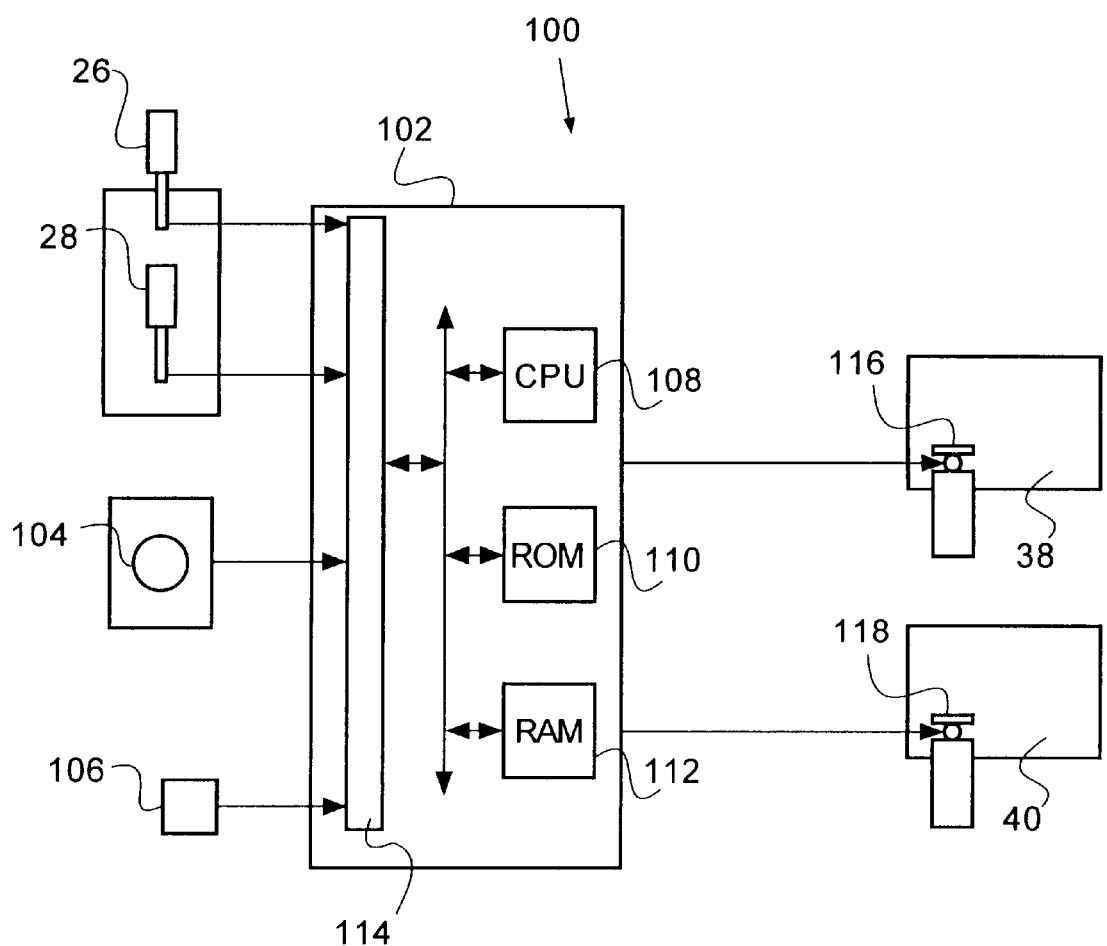
FIG. 3 is a block diagram of the hydrostatic drivetrain controller according to the present invention.

FIG. 3 shows a block diagram of a hydrostatic drive control system 100 according to the present invention. The control system 100 receives input signals from the right joystick 26 and the left joystick 28 respectively. The right and left joysticks 26 and 28 are located on the sides of the operator seat 22 in the operator compartment 24. The control system 100 enables the left joystick 28 to control the hydraulic flow to the left motor 46 which drives the left wheels 18 and 20. Correspondingly, the right joystick 26 controls the hydraulic flow to the right motor 44 driving the right wheels 14 and 16. The input signals from the right and left joysticks 26 and 28 are coupled to a controller module 102.

One control configuration for the right and left joysticks 26 and 28 electronically couples the joysticks 26 and 28 to the hydraulic fluid flow controls to drive the wheels 14–20. The wheels 14–20 are driven forward when both joysticks 26 and 28 are pushed forward. The wheels 14–20 are driven backwards when both joysticks 26 and 28 are pulled backwards. The work vehicle 10 may be turned by simultaneously pushing the left joystick 28 forward and pulling the right joystick 26 backwards for a right turn or by simultaneously pushing the right joystick 26 forward and pulling the left joystick 28 backwards for a left turn. This provides a very tight turn radius for the work vehicle. Precise control of power to the wheels 14–20 is possible with the controller module 102 according to the present invention as will be explained below.

The operator compartment 24 also has a bias control adjustment knob 104 which is coupled to the controller module 102. As will be described below, the bias control adjustment knob 104 allows a user to provide greater relative power to either the left wheels 14 and 16 or the right wheels 18 and 20 of the work vehicle 10. In the preferred embodiment, by turning the knob 104 clockwise, greater relative power is supplied to the right wheels 18 and 20. Similarly, turning the knob 104 counterclockwise causes the relative power to increase to the left wheels 14 and 16. The magnitude of the relative power to the right or left wheels 14–20 is proportional to how far the knob 104 is turned to either side.

The control system 100 also includes a gear pump speed sensor 106 coupled to the controller module 102. The speed of the engine 32 is measured by a gear pump speed sensor 106. The gear pump speed sensor 106 measures engine speed by monitoring the speed of the gear pump 42. The measurement of the speed of the gear pump 42 is proportional to the speed of the engine 32 and provides an indication of the actual engine speed in revolutions per minute.

The inputs are read by the controller module 102 which is a programmable microcontroller. The microcontroller is preferably an application specific integrated circuit (ASIC). However, other suitable microcontrollers or microprocessors may be used. The controller module 102 has a central processing unit 108 (CPU). The central processing unit 108 is capable of reading specific programming instructions stored in a permanent memory such as read only memory (ROM) 110. Temporary data may be stored in a random access memory (RAM) 112 which is coupled to the CPU 108. The central processing unit 108 has an input/output controller 114 which generates signals and reads signal inputs.

The outputs from the controller module 102 control the angle of a swash plate 116 of the right drive pump 38 and a swash plate 118 of the left drive pump 40. Operator controls such as joysticks 26 and 28 provide the commands to change the angle of the swash plates 116 and 118 in order to provide more or less fluid flow from the drive train pumps 38 and 40 to the motors 44 and 46. The fluid flow rate or pressure is proportional to the power outputs. Thus, the fluid flow determines how much power drives the wheels 14–20.

Figure 4:
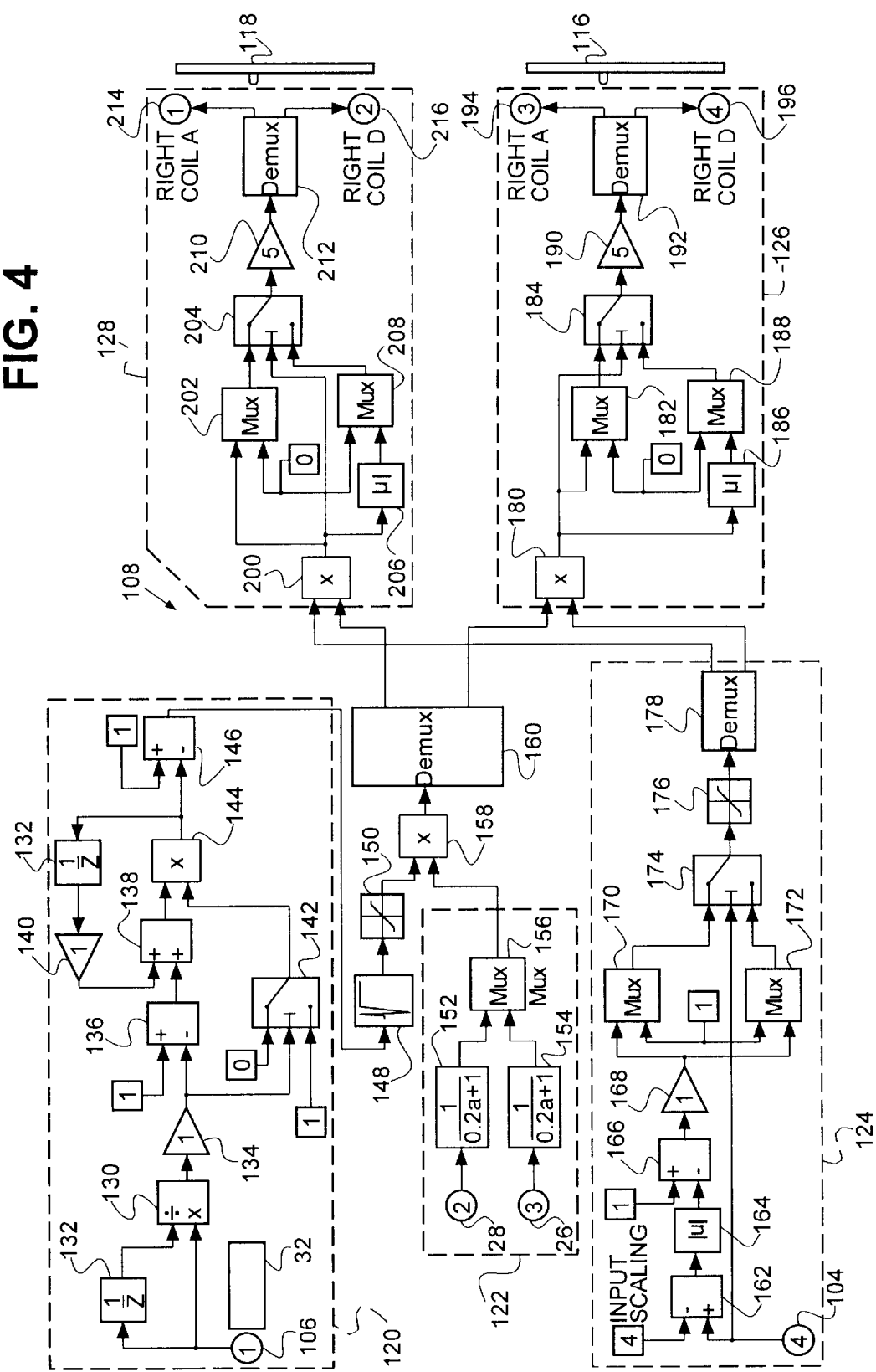
FIG. 4 is an electronic schematic of the hydrostatic controller according to the present invention.

FIG. 4 shows a circuit diagram of the hydrostatic drive controller module 102 according to the present invention. Specifically the circuit diagram in FIG. 4 represents the configuration of the CPU 108. The CPU 108 has an anti-stall circuit 120, a joystick control circuit 122, and a bias control circuit 124. The outputs of the circuits 120, 122 and 124 are read by a right motor control circuit 126 and a left motor control circuit 128. Although the preferred embodiment uses an ASIC for the controller module 102 and CPU 108, it is to be understood that the processing described below may be implemented using appropriate software, appropriate hardware or any combination of software and hardware.

The anti-stall control circuit 120 determines whether the engine 32 is near stall speed and produces a corrective scaling value to reduce the magnitude of the control signal output to the right and left motor control circuits 126 and 128. The signal from the speed sensor 106 is input into a ratio calculation circuit 130. The ratio calculation circuit 130 calculates the ratio between the instant engine speed determined by the input signal from the speed sensor 106 and a stored engine speed taken at a predetermined period prior to the instant measurement. Thus, the other input of the ratio calculation circuit 130 is coupled to an engine speed memory 132. The engine speed memory 132 in the preferred embodiment stores the engine speed from four sample periods prior to the present engine speed measurement. In the preferred embodiment, the engine speed is measured by the engine speed sensor 106 at a 100 hertz interval period. Of course other prior periods or sensing intervals may be used.

The ratio calculation circuit 130 determines the ratio of the present engine speed to the previous engine speed. This determination allows the controller module 102 to determine whether the engine speed has dropped during the interval if the resulting ratio is less than one. The output of the ratio calculation circuit 130 is amplified by a gain amplifier 134 which multiplies the ratio by a gain factor which is specific to the machinery being operated. For explanation purposes, all gains in FIG. 4 are set to one.

The output from the gain amplifier 134 is subtracted from a constant input by a summing circuit 136. In the preferred embodiment, the constant input is one. The output of the summing circuit 136 is thus the percentage of engine speed drop, if engine speed drops from the previous engine speed value. The output of the summing circuit 136 is input into a summing circuit 138. The other input of the summing circuit 138 is a feedback value from the engine speed memory 132 which is amplified by a gain value by gain amplifier 140. The summing circuit 138 thus adds the percentage of engine speed drop from summing circuit 136 with the previous engine speed from memory 132 to generate the total engine speed drop. The previous engine speed stored in memory 132 continues to be stored while engine speed drops. However, if engine speed increases, the previous engine speed stored in memory 132 is reinitialized to zero.

The output of the gain amplifier 134 is also coupled to a variable switch 142. The variable switch 142 outputs either a zero or a one value depending on its input value. The variable switch 142 compares the ratio value output from the gain amplifier 134 with a set value in order to determine whether engine speed has increased or decreased. In the case of an increase, where the ratio value is greater than 1.04 in the preferred embodiment, the output of the switch 142 is set at zero. If the engine output has decreased, the ratio value will be less than 1.04, and the output of the switch 142 will be set as one. Of course, different values other than 1.04 may be used to determine sufficient engine speed decrease depending on the application.

The output of the summing circuit 138 is then multiplied by the output of the switch 142 by a multiplication circuit 144. Thus, if the engine speed increases, the output from the switch 142 will be zero and there will be a zero output from the multiplication circuit 144. If the engine speed has dropped, the output of the multiplication circuit 144 will be the output of the summing circuit 138 which is the total drop in engine speed.

The resulting value is then subtracted from a constant input, one, by a summing circuit 146 to output the percentage of current engine speed. In the case of an increase in engine speed, the output of the switch 142 will be zero, and thus the percentage value from the summing circuit 146 will be one. The percentage drop from summing circuit 146 is input into a comparison circuit 148. The comparison circuit 148 references a look-up table stored in the ROM 110 of the controller module 102. The look-up table provides various scaling values for joystick commands to decrease hydraulic fluid levels for the piston pumps 38 and 40 to prevent the stall of the engine 32 at the specified speed. The look-up table values are determined experimentally based on the type of engine used and the type of hydraulic pumps used.

The scaling value which is output from the comparison circuit 148 is compared to a saturation value in a saturation determination circuit 150. In the preferred embodiment, the engine 32 has a stall speed between 2200 and 2400 r.p.m. Thus, if the engine speed drops below 2200 r.p.m., the saturation determination circuit 150 sets the scaling value to the value corresponding to 2200 r.p.m. For example, in the preferred embodiment the scaling value corresponding to 2200 r.p.m. is 0.3. If the engine speed is between 2200 and 2400 r.p.m., the scaling value derived from the look-up table by the comparison circuit 148 is output from the saturation determination circuit 150. If the engine speed is above 2400 r.p.m., the determination circuit outputs a scaling value of one. This graduation is linear between 0.3 and 1 in the preferred embodiment.

The joystick control circuit 122 provides the inputs from the user-operated joysticks 26 and 28. Both joysticks 26 and 28 provide a positive signal when moved forward and a negative signal when moved backward. The right joystick 26 provides an analog signal which is proportional to the position of the joystick 26. The magnitude of the signal output is proportional to how far forward or backward the right joystick 26 is moved. A larger signal output signifies more desired power to the right wheels 18 and 20. The signal from the right joystick 26 is input to a low-pass filter 154 to filter out signal noise. Similarly, the output of the left joystick 28 is filtered through a low-pass filter 152. The filtered output signals of the joysticks 26 and 28 are input into a multiplexer 156. The output of the multiplexer 156 is coupled to the input of a multiplication circuit 158. The other input of the multiplication circuit 158 is coupled to the output of the saturation determination circuit 150. Thus, both of the joystick input signals are multiplied by the determined scaling value from the comparison circuit 148 to decrease power to the pumps 38 and 40 to prevent engine stall. The output of the multiplier circuit 158 is sent to a demultiplexer 160 which outputs a right and left control signal to the right and left motor control circuits 126 and 128.

In the case when the engine speed is increasing, the output of the summing circuit 146 will be one, since a zero will be output from the multiplier circuit 144. In this case, the full value of the signals from the joysticks 26 and 28 will be output as the right and left signals from the demultiplexer 160.

If the engine speed is close to a stall, the output from the joysticks 26 and 28 will be reduced by the scaling value determined by the comparison circuit 148 from the look up table. This will decrease the command signals by the scaling value, decreasing engine demand to prevent stalling.

The right motor control circuit 126 and the left motor control circuit 128 also have inputs from the bias adjustment circuit 124. The bias adjustment circuit 124 allows an operator to apply greater relative power to either the right pump 38 or the left pump 40 in order to supply greater relative power to either the right or left wheels.

The bias adjustment circuit 124 includes the bias adjustment knob 104. The bias adjustment knob 104 outputs a bias control signal having a range between 3 to 5 volts in the preferred embodiment. Of course other voltage ranges may be used. Additionally, other control devices such as variable slide switches or positional switches may be used instead of the bias control knob 104 to set the desired relative power. The settings for relative power may also be input through a touchscreen device or keypad in conjunction with a video or other monitor.

In the preferred embodiment, the voltage input varies from five volts representing power bias to the right piston pump 38 and right motor 44 to three volts representing power bias to the left piston pump 40 and the left motor 46. The amount that the bias adjustment knob 104 is rotated clockwise determines the magnitude of additional power to the right motor 44. The bias signal varies from four to five volts depending on the clockwise position of the knob 104. Similarly, the knob 104 is rotated counterclockwise for additional power to the left motor 46, varying between four and three volts.

The output signal from the bias adjustment knob 104 is modified by an input scaling value by a summing circuit 162. In the preferred embodiment, four volts is subtracted from the output of the bias adjustment knob 104 by the summing circuit 162. An absolute value circuit 164 outputs the absolute value of the output of the summing circuit 162. Thus, the magnitude of the power bias is determined by the absolute value circuit 164 which receives the output of the summing circuit 162. The output of the absolute value circuit 164 is subtracted from a constant value by a summing circuit 166. The constant in the preferred embodiment is one, although other constants may be used depending on the mechanical and electrical characteristics of the hydrostatic drive. The resulting value provides the percentage decrease in power for one motor to create greater relative power to the other motor.

The output of the summing circuit 166 is coupled to a gain amplifier 168. The output of the gain amplifier circuit 168 is input into one input of multiplexers 170 and 172. The other input of the multiplexers 170 and 172 is a constant value which is one in the preferred embodiment. The output of the multiplexer 170 is coupled to the top input of a variable switch 174. The output of the multiplexer 172 is coupled to the bottom input of the variable switch 174.

The output signal of the bias adjustment knob 104 is also coupled into the variable switch 174. The variable switch 174 compares the output of the bias adjustment knob 104 with a 4 volt value. If the input is greater than 4 volts, the variable switch 174 selects the top input and thus outputs the signal from the multiplexer 170. These signals represent greater relative power to the right wheels 18 and 20. Thus, the right signal will be one, and the left signal will be set to the value determined by the summing circuit 166. If the signal from the bias adjustment knob 104 is less than 4 volts, the variable switch 174 selects the bottom input and outputs the output of the multiplexer 172. These signals represent greater relative power to the left wheels 14 and 16. Thus, the right signal will be set to the value determined by the summing circuit 166 and the left signal will be one.

The output of the variable switch 174 is compared to a saturation level by a saturation level circuit 176. The saturation level for the bias control is 0.9 in the preferred embodiment. Thus, the bias signal will be set to 0.9 if the value determined by the summing circuit 166 is less than 0.9. The saturation level may be different values from 0.9 depending on the desired relative power increases. The output of the summing saturation level circuit 176 is coupled to a demultliplexer 178 which separates the signal into a right bias signal and a left bias signal.

The two outputs of the demultiplexer 178 provide the right and left bias signals for the right motor control circuit 126 and the left motor control circuit 128. The right motor control circuit 126 functions in the same method as the left motor control circuit 128. The right motor control circuit 126 has a multiplier circuit 180 which receives the right bias signal input from the demultiplexer 178 and the scaled right joystick signal from the demultiplexer 160. These signals are multiplied together by the multiplier circuit 180.

The resulting value is input to a multiplexer 182. The other input of the multiplexer 182 is coupled to a constant value which is zero. The output of the multiplexer 182 is tied to the top input of a variable switch 184. The output of the multiplier circuit 180 is also input into an absolute value conversion circuit 186 which produces an absolute value of the output of the multiplier circuit 180. The absolute value is input to a multiplexer 188. The other input of the multiplexer 188 is coupled to a constant value which is zero. The output of the multiplexer 188 is input to the bottom input of the variable switch 184.

The output of the multiplier 180 is also coupled to the switch input of the variable switch 184. The variable switch 184 switches to the top input if the output value of the multiplier circuit 180 is positive indicating forward motion. The variable switch 184 switches to the bottom input if the output value of the multiplier circuit 180 is negative indicating backward motion. The output signal from the switch 184 will thus either be the output value from multiplexer 182 if forward motion is desired, or the output value from multiplexer 188 if rearward motion is desired.

The output signal from the switch 184 is coupled to a gain amplifier 190. The output of the gain amplifier 190 is coupled to a demultiplexer 192. The first output of the demultiplexer 192 is connected to a right forward coil 194 which activates the swash plate 116 to allow fluid flow from the right drive pump 38 to drive the right motor 44 forward. The second output of the demultiplexer 192 is connected to a right backward coil 196 which activates the swash plate 116 to allow fluid flow from the right drive pump 38 to drive the right motor 44 backwards. An example of the coils 194 and 196 is a Sundstrand KVMB11204 displacement control which has two fluid flow outputs to the right motor 44 for forward and backward rotation.

The right control signal from the right joystick 26 produced by the joystick control circuit 122 is scaled to prevent stalling by the anti-stall circuit 120. The signal will be positive if the right joystick 26 is pushed forward or negative if the right joystick 26 is pulled backward. The signal is further modified by a scaling value bias output of the bias circuit 124. The control signal is either sent to the right forward coil 194 or the right backward coil 196 by the demultiplexer 192. A zero signal is sent to the opposite coil by the demultiplexer 192.

Similarly, the left motor control circuit 128 has a multiplier circuit 200 which receives the left bias signal input from the demultiplexer 178 and the scaled left joystick signal from the demultiplexer 160. These signals are multiplied together by the multiplier circuit 200.

The resulting value is input to a multiplexer 202. The other input of the multiplexer 202 is coupled to a constant value which is zero. The output of the multiplexer 202 is tied to the top input of a variable switch 204. The output of the multiplier circuit 200 is also input into an absolute value conversion circuit 206 which produces an absolute value of the output of the multiplier circuit 200. The absolute value is input to a multiplexer 208. The other input of the multiplexer 208 is coupled to a constant value which is zero. The output of the multiplexer 208 is input to the bottom input of the variable switch 204.

The output of the multiplier 200 is also coupled to the switch input of the variable switch 204. The variable switch 204 switches to the top input if the output value of the multiplier circuit 200 is positive indicating forward motion. The variable switch 204 switches to the bottom input if the output value of the multiplier circuit 200 is negative indicating backward motion. The output signal from the switch 204 will thus either be the output value from multiplexer 202 if forward motion is desired, or the output value from multiplexer 208 if rearward motion is desired.

The output signal from the switch 204 is coupled to a gain amplifier 210. The output of the gain amplifier 210 is coupled to a demultiplexer 212. The first output of the demultiplexer 212 is connected to a left forward coil 214 which activates the swash plate 118 to allow fluid flow from the left drive pump 40 to drive the left motor 46 forward. The second output of the demultiplexer 212 is connected to a left backward coil 216 which activates the swash plate 118 to allow fluid flow from the left drive pump 40 to drive the left motor 46 backwards.

It will be apparent to those skilled in the art that various modifications and variations can be made in the method and system of the present invention without departing from the spirit or scope of the invention. For example, many other attachable work vehicles with hydrostatic drives may use the present invention to maximize the efficiency of attachable implements. Thus, the present invention is not limited by the foregoing descriptions but is intended to cover all modifications and variations that come within the scope of the spirit of the invention and the claims that follow.

What is claimed is:

1. A drive train control system for a hydrostatic motor drive having an engine rotatably coupled to drive a fluid pump fluidly coupled to a drive motor, the control system comprising:
   a speed sensor which periodically senses the speed of the engine;
   an operator control which generates a signal representative of desired fluid flow to the drive motor;
   an anti-stall circuit coupled to the speed sensor, the anti-stall circuit including:
      a stall circuit which compares the engine speed with a previously determined engine speed to determine the susceptibility of the engine to a stall;
      a stall correction circuit which produces a scaling value derived from the susceptibility of a stall; and
      a multiplier circuit coupled to the output of the stall correction circuit and operator control which generates a modified control signal for the fluid pump by multiplying the control signal with the scaling value.

2. The system of claim 1 further comprising:
   a second fluid pump;
   a second drive motor fluidly coupled to the second fluid pump;
   a second operator control which generates a signal representative of desired fluid flow to the second drive motor;
   a second multiplier circuit coupled to the output of the stall correction circuit and second operator control which generates a second modified control signal for the second fluid pump by multiplying the second control signal with the scaling value.

3. The system of claim 2 further comprising:
   a bias control which enables an operator to select greater relative power to either the first or second motor, the bias control generating a signal proportional to the desired greater power;
   a bias control circuit coupled to the bias control, the bias control circuit generating a scaling signal proportional to bias signal;
   a first bias multiplier circuit coupled to the bias control circuit and the output of the first multiplier circuit;
   a second bias multiplier circuit coupled to the bias control circuit and the output of the second multiplier circuit; wherein
   the multiplied control signal is applied to the nonselected motor.

4. The system of claim 1 wherein the stall circuit further comprises:
   a memory coupled to the engine speed sensor, the memory storing engine speed values at predetermined intervals;
   a ratio calculation circuit calculating the ratio between the engine speed and a previous engine speed value;
   a comparison circuit to determine whether the engine may be in a stall condition by determining whether the ratio is less than a predetermined value.

5. The system of claim 2 wherein the first and second controls produce a positive signal to signify desired forward movement of the first and second motor and a negative signal to signify desired backward movement of the first and second motors.

6. The system of claim 1 wherein the anti-stall circuit further comprises:
   a memory having a lookup table of engine speeds and scaling values; and
   a selection circuit which reads the engine speed signal and selects a corresponding scaling value to be output as the scaling value signal.

7. The system of claim 6 wherein the anti-stall circuit further includes a saturation circuit coupled to the selection circuit which compares the scaling value to a minimal speed value and sets the scaling value to a minimal speed value if the scaling value is lower than the minimal speed value.

8. The system of claim 5 wherein the first and second fluid pumps have swash plates with a front and back coil to activate forward and backward fluid flow, and corresponding forward and backward rotation of the first and second motor, the front coils being energized with a positive signal from the first or second controller and the back from the first of second controller and the back coil being energized with a negative signal from the first or second controller.

9. A drive train control bias system for a hydrostatic motor drive having an engine rotatably coupled to drive a first fluid pump fluidly coupled to a first drive motor and to drive a second fluid pump fluidly coupled to a second drive motor, the bias control system comprising:
   a first drive control generating a signal proportional to the level of power desired from the first motor;
   a second drive control generating a signal proportional to the level of power desired from the second motor;
   a bias control for selection of greater relative power to either the first or second drive motor, the bias control generating a signal proportional to the selected greater relative power;
   a scaling circuit coupled to the bias control generating a scaling value as a function of the greater relative power signal;

a selection circuit coupled to the scaling circuit, the selection circuit having a first output which is the value of the scaling signal and a second output which is a preselected value;

a first multiplier circuit coupled to the outputs of the selection circuit and the first drive control, multiplying the two signals to produce a control signal to the first fluid pump; and a second multiplier circuit coupled to the outputs of the selection circuit and the second drive control, multiplying the two signals to produce a control signal to the second fluid pump, wherein the selection circuit outputs the second output to the multiplier of the selected first or second motor and outputs the first output to the other multiplier.

10. The system of claim 9 further comprising:

a speed sensor which periodically senses the speed of the engine;

an anti-stall circuit coupled to the speed sensor, the anti-stall circuit including:

a stall circuit which compares the engine speed with a previously determine engine speed to determine the susceptibility to a stall;

a stall correction circuit which produces a scaling value derived from the susceptibility of a stall; and a multiplier circuit coupled to the output of the stall correction circuit and the first and second operator control which generates a modified control signal for the fluid pump by multiplying the control signals with the scaling value.

11. The system of claim lo wherein the bias control produces a signal between a predetermined voltage range, with a constant output voltage within the range, and wherein the selection circuit compares the bias control signal with the constant output voltage to determine the outputs to the first and second multiplexer.

12. The system of claim 10 wherein the bias control is a rotatable knob which produces the bias control signal proportionally to the rotation of the knob.

* * * * *